United States Patent
Mosimann et al.

(10) Patent No.: US 9,617,138 B2
(45) Date of Patent: Apr. 11, 2017

(54) OUTPUT UNIT FOR A BEVERAGE DISPENSER, BEVERAGE DISPENSER HAVING SUCH AN OUTPUT UNIT AND METHOD FOR OPERATING SUCH A BEVERAGE DISPENSER

(71) Applicant: Schaerer AG, Zuchwil (CH)

(72) Inventors: Bruno Mosimann, Rüegsauschachen (CH); Peter Sinzig, Moosseedorf (CH); Felix Bühlmann, Kriegstetten (CH)

(73) Assignee: SCHAERER AG, Zuchwil (CH)

( * ) Notice: Subject to any disclaimer, the term of this patent is extended or adjusted under 35 U.S.C. 154(b) by 133 days.

(21) Appl. No.: 14/402,926

(22) PCT Filed: Apr. 16, 2013

(86) PCT No.: PCT/EP2013/057911
§ 371 (c)(1),
(2) Date: Nov. 21, 2014

(87) PCT Pub. No.: WO2013/182340
PCT Pub. Date: Dec. 12, 2013

(65) Prior Publication Data
US 2015/0102062 A1    Apr. 16, 2015

(30) Foreign Application Priority Data
Jun. 4, 2012 (CH) .................... 763/2012

(51) Int. Cl.
*B67D 1/00* (2006.01)
*A47J 31/46* (2006.01)

(52) U.S. Cl.
CPC .......... *B67D 1/0022* (2013.01); *A47J 31/467* (2013.01)

(58) Field of Classification Search
CPC ................ A47J 31/467; B67D 1/0022
See application file for complete search history.

(56) References Cited

U.S. PATENT DOCUMENTS 4,211,342 A * 7/1980 Jamgochian ......... B67D 1/0036
222/129.4
4,550,651 A    11/1985 Haynes
(Continued)

FOREIGN PATENT DOCUMENTS

CH     682798 A5    11/1993
DE    8907183 U1     7/1989
(Continued)

OTHER PUBLICATIONS

International Search Report dated May 16, 2013 for PCT/EP2013/057911.
(Continued)

*Primary Examiner* — Frederick C Nicolas
*Assistant Examiner* — Bob Zadeh
(74) *Attorney, Agent, or Firm* — Pearne & Gordon LLP

(57) ABSTRACT

An output unit for a beverage dispenser outputs hot beverages and/or ingredients for beverages to a container standing below the output unit. The output unit has one or more outlet assemblies for beverages and/or ingredients. Improved cleaning and/or mixing is achieved in that each of the outlet assemblies has a central inner outlet and an outer outlet which concentrically encloses the inner outlet, and in that the outer outlet is designed as a ring nozzle directed in the outlet direction so that a fluid which is output through the outer outlet encloses the inner outlet in the form of a concentric liquid sheath.

32 Claims, 6 Drawing Sheets

(56) References Cited

U.S. PATENT DOCUMENTS

| | | |
|---|---|---|
| 5,189,949 A | 3/1993 | Apa |
| 5,312,020 A | 5/1994 | Frei |
| 5,724,883 A | 3/1998 | Usherovich |
| 5,855,162 A * | 1/1999 | Bauer ............... A47J 31/46 222/566 |
| 5,957,033 A | 9/1999 | In-Albon |
| 6,345,729 B1 | 2/2002 | Santy, Jr. |
| 2002/0134248 A1 | 9/2002 | Eugster |
| 2003/0052206 A1 | 3/2003 | Fouquet |
| 2003/0079612 A1 | 5/2003 | Con |
| 2004/0118291 A1 * | 6/2004 | Carhuff ............... A47J 31/401 99/275 |
| 2005/0045655 A1 | 3/2005 | Santy, Jr. |
| 2006/0230943 A1 | 10/2006 | Stieger et al. |
| 2007/0202234 A1 | 8/2007 | Ludwig |
| 2009/0214742 A1 | 8/2009 | Peden et al. |
| 2009/0293733 A1 | 12/2009 | Martin et al. |
| 2010/0162898 A1 | 7/2010 | Mahlich |
| 2011/0014339 A1 | 1/2011 | Stahl et al. |
| 2011/0045152 A1 | 2/2011 | Stutz et al. |
| 2011/0301738 A1 | 12/2011 | Freeman |
| 2013/0263745 A1 | 10/2013 | Bombeck et al. |
| 2015/0102062 A1 * | 4/2015 | Mosimann ........... B67D 1/0022 222/129.1 |

FOREIGN PATENT DOCUMENTS

| | | |
|---|---|---|
| DE | 1137324 C1 | 2/1993 |
| DE | 20102048 U1 | 1/2002 |
| DE | 102004025037 A1 | 12/2005 |
| DE | 202007008814 U1 | 11/2007 |
| DE | 102007060476 A1 | 2/2009 |
| DE | 202011051719 U1 | 1/2012 |
| DE | 202008018339 U1 | 3/2013 |
| EP | 0373985 A1 | 6/1990 |
| EP | 0528758 A1 | 2/1993 |
| EP | 0761150 A1 | 3/1997 |
| EP | 0820715 A1 | 1/1998 |
| EP | 1626375 A1 | 2/2006 |
| EP | 2011421 A1 | 1/2009 |
| EP | 2011422 A1 | 1/2009 |
| EP | 2030538 A2 | 3/2009 |
| EP | 2036466 A1 | 3/2009 |
| EP | 2078481 A1 | 7/2009 |
| EP | 2119383 A1 | 11/2009 |
| EP | 2130466 A1 | 12/2009 |
| EP | 2189085 A1 | 5/2010 |
| EP | 2198762 A1 | 6/2010 |
| EP | 2220972 A1 | 8/2010 |
| EP | 2238876 A2 | 10/2010 |
| EP | 2412280 A1 | 2/2012 |
| EP | 2478803 A1 | 7/2012 |
| EP | 2268175 B1 | 5/2013 |
| JP | 10287394 | 10/1998 |
| JP | 2009255942 A | 11/2009 |
| WO | 9302605 A1 | 2/1993 |
| WO | 9307792 A1 | 4/1993 |
| WO | 0174211 A1 | 10/2001 |
| WO | 2005113411 A2 | 12/2005 |
| WO | 2006090183 A2 | 8/2006 |
| WO | 2006135864 A2 | 12/2006 |
| WO | 2007072374 A2 | 6/2007 |
| WO | 2008015097 A2 | 2/2008 |
| WO | 2009027259 A2 | 3/2009 |
| WO | 2009056426 A1 | 5/2009 |
| WO | 2009081299 A1 | 7/2009 |
| WO | 2009130099 A1 | 10/2009 |
| WO | 2009140349 A2 | 11/2009 |
| WO | 2010026045 A1 | 3/2010 |
| WO | 2011139151 A1 | 11/2011 |
| WO | 2012036635 A1 | 3/2012 |
| WO | 2013117362 A1 | 8/2013 |

OTHER PUBLICATIONS

International Search Report and Written Opinion dated Apr. 21, 2016 for PCT/EP2015/000309.

International Search Report dated Aug. 8, 2013 for PCT/EP2013/052780.

International Search Report dated Mar. 28, 2013 for PCT/EP2013/052779.

* cited by examiner

OUTPUT UNIT FOR A BEVERAGE DISPENSER, BEVERAGE DISPENSER HAVING SUCH AN OUTPUT UNIT AND METHOD FOR OPERATING SUCH A BEVERAGE DISPENSER

TECHNICAL FIELD

The present invention relates to the field of automatic beverage dispensers. It relates to an output unit for an automatic beverage dispenser according to the preamble of claim 1. It further relates to a beverage dispenser comprising such an output unit and to a method for operating such an automatic beverage dispenser.

STATE OF THE ART

Known automatic beverage dispensers include, for example, automatic coffee dispensers, in which for each coffee to be drawn the coffee is freshly ground from beans, supplied to a brewing chamber, and the coffee to be drawn is brewed under optimal conditions. Such automatic coffee dispensers can also be supplemented with devices in which milk in varying consistencies can be added in the known manner to the coffee to be drawn, whereby such coffee machines can produce not only regular coffee and espresso, but also latte, cappuccino and latte macchiato or the like. Additionally, such machines can also be designed to deliver beverages containing chocolate.

Coffee beverages in which a flavoring agent in the form of syrup is added to the coffee that is prepared in the coffee machine are also becoming increasingly popular. Particularly suitable flavors in this connection are vanilla, amaretto, hazelnut, caramel, cinnamon, almond or chocolate, for example. These flavoring agents can be supplied manually to the coffee beverage that is prepared in the coffee machine, but can also be supplied automatically.

Moreover, automatic beverage dispensers for dispensing hot milk-based or cocoa-based beverages are known, in which a mixture made of milk and syrup or hot water and an appropriate chocolate powder is produced and dispensed.

A coffee machine for dispensing brewed coffee comprising a coffee spout is known from published prior art EP 2 011 422 B1, with which at least one supply means is associated for dispensing at least one flavoring agent, the supply means being configured in each case with a container for accommodating a flavoring agent, and delivery and metering means for delivering a metered amount of the flavoring agent from the container into a line. The line is provided with a spout, which is arranged so that the delivered flavoring agent is transferred into the vessel located under the coffee spout. An option for cleaning is not disclosed.

A device for preparing flavored hot beverages, in particular coffee, milk, tea or mixed beverages, is known from published prior art EP 2 030 538 A2, comprising a device for preparing the hot beverage, which includes a first outlet via which the hot beverage can be dispensed into a receiving vessel, such as a cup, a mug or the like. At least one second outlet is provided, which is fluidically separated from the first outlet and which is fluidically connected to at least one flavoring agent reservoir for dispensing at least one flavoring agent, in particular a syrup, into the receiving vessel. An option for cleaning is not disclosed.

Published prior art EP 2 412 280 A1 discloses a device for dispensing a beverage comprising a predetermined amount of a liquid base product and a predetermined amount of at least one flavoring agent. The device comprises at least one container containing the liquid base product, at least one container containing the flavoring agent, a vessel for collecting the flavored beverage, and a suction/pressure unit having a suction inlet and a pressure outlet. The suction inlet of the unit is connected to the containers for the liquid base product and the flavoring agent by way of conduits that are provided with valves, while the pressure outlet is connected to a nozzle for dispensing the flavored beverage. Cleaning is not disclosed.

Published prior art WO 2006135864 A2 describes an automated hot beverage machine. The machine comprises a plurality of flavoring reservoirs, which are connected by way of pumps and valves to a plenum, from which the flavoring agent is directly dispensed into a mixing chamber. The mixing chamber is also supplied with milk and steam so as to make a mixture of milk, steam and flavoring agent possible and then fill the mixture into a dispensing container. The automated machine can comprise a coffee brewing system so that it is able to generate flavored coffee/milk beverages such as cappuccino or latte macchiato and the like. A Venturi system delivers cooled milk and ambient air and dispenses these to a mixer. The flavoring agent is introduced into the mixer. The steam is conducted to the plenum to allow dispensing of the flavoring agent and ensure cleanliness of the plenum.

A flavoring agent dispensing system for an automatic coffee dispenser is known from published prior art US 2007202234 A1. The system draws a metered amount of a flavoring liquid from one or more flavoring liquid sources by way of a pump or a valve. A special device displaces the flavoring liquid in the line in such a way that undesirable dripping of flavoring liquid after the dispensing step is prevented. Cleaning is not disclosed.

Published prior art WO 2008015097 A1 describes an output unit for additives, comprising a plurality of containers and a plurality of pumps, which are disposed in each case on a supporting structure. The pumps are connected to the containers to dispense one or more additives from the containers. The unit can be disposed on a coffee machine. Cleaning is not disclosed.

In such known systems for adding flavoring agents in syrup form to a base beverage, such as freshly brewed coffee, effective discharge is problematic. At the outlet, the syrup comes into contact with the ambient area and begins to crystallize. Moreover, drops can form at the outlet due to the consistency of the syrup, which is undesirable.

For automatic beverage dispensers in the field of soft drinks, in which the beverage is mixed from water containing syrup and carbonated water in a respective dispensing nozzle, published prior art JP 10287394 proposed to clean the dispensing nozzles in a simple and effective manner while installed by providing a special rinsing cycle, by which at the push of a button or by way of a timer carbonated water is conducted into the output unit so as to effectively wash off contamination adhering to the dispensing nozzle. This cleaning is specifically tailored to soft drink machines.

Published prior art JP 2009255942 discloses a cleaning device for a beverage outlet of a machine for preparing soft drinks, in which an adapter is attached to the output unit to redirect carbonated water to the laterally disposed syrup nozzles so that these are cleaned. This cleaning is specifically tailored to soft drink machines.

Finally, a coffee machine having an integrated milk frothing function, comprising a coffee outlet and a milk outlet, is known from published prior art EP 820 715 A1, in which the coffee outlet and the milk outlet are designed to be combined into one outlet unit and are disposed coaxially to each other. The milk outlet surrounds the coffee outlet. Axially extending webs are provided in the milk outlet, which impart a swirl to the milk. The milk outlet has a mouth opening extending at an incline relative to the vertical, which causes the milk to exit the milk outlet laterally at a defined point, facilitating the positioning of the cup underneath the outlet. The outlet unit comprises an emulsifying chamber for frothing the milk, which is connected to a mixing device for mixing air, steam and milk, wherein the coffee outlet extends axially through the emulsifying chamber. Due to the obliquely cut outer outlet, neither thorough mixing of the fluids from the inner and outer outlets (in this case, of coffee and milk) can be achieved with this arrangement, nor can the outer outlet be used for the targeted cleaning or rinsing of the inner outlet.

Incidentally, automatic coffee dispensers are generally known for rinsing or cleaning of the lines leading to the beverage outlet, and of the beverage outlet itself, being carried out by running cold or heated water with or without cleaning additives through these lines and discharging it at the outlet into an appropriate collection container. However, this typically requires additional line structures and valves so as to be able to switch between normal operation and a cleaning or rinsing mode.

DESCRIPTION OF THE INVENTION

It is an object of the invention to provide an output unit for an automatic beverage dispenser which not only can be used flexibly for preparing beverages, but also permanently enables hygienic conditions at the machine in a simple manner.

It is a further object of the invention to create an automatic beverage dispenser comprising such an output unit.

It is also an object of the invention to provide a method for operating such an automatic beverage dispenser.

These and other objects are achieved by the features of claims 1, 7 and 22.

The invention relates to an output unit for an automatic beverage dispenser, in particular for dispensing hot beverages, by which a beverage and/or ingredients for a beverage are dispensed to a subjacent vessel, wherein the output unit comprises one or more outlet assemblies for beverages and/or ingredients. The outlet assemblies in each case comprise a central inner outlet and an outer outlet, which concentrically surrounds the inner outlet. The output unit according to the invention is characterized in that the outer outlet is designed in such a way as an annular nozzle directed in the outlet direction that a fluid that is dispensed through the outer outlet encloses the inner outlet in the form of a concentric fluid sheath. As a result of this arrangement of the inner outlet and the outer outlet, thorough mixing can be achieved when both outlets are used to dispense a beverage ingredient. In addition, the inner outlet can be easily rinsed or cleaned via the outer outlet.

One embodiment of the invention is characterized in that the inner outlet is formed by the end of a line, and the outer outlet is recessed relative to the inner outlet in the outlet direction. In this way a concentric fluid sheath forms, which effectively interacts with the inner outlet.

In particular, the outside wall of the line can also form the inside wall of the outer outlet.

A further embodiment of the invention is characterized in that the output unit comprises multiple outlet assemblies, which are preferably disposed next to each other and which in each case comprise an inner and an outer outlet, and the outer outlets of the outlet assemblies comprise separate input ends. In this way, it is possible to individually select the outer outlet of each individual outlet assembly for dispensing fluid.

However, it is also conceivable for the output unit to comprise multiple outlet assemblies, which are preferably disposed next to each other and which in each case comprise an inner and an outer outlet, and for the outer outlets of the outlet assemblies to comprise a shared input end. In this way, all outlet assemblies can be collectively rinsed or cleaned in a simple manner.

A further embodiment is characterized in that at least some of the outer outlets of the outlet assemblies are part of a rinsing device.

The automatic beverage dispenser according to the invention, which is provided in particular for dispensing hot beverages, comprises an output unit, by which a beverage and/or ingredients for a beverage are dispensed to a subjacent vessel, wherein the output unit is designed according to the invention.

One embodiment of the automatic beverage dispenser according to the invention is characterized in that the automatic beverage dispenser comprises a coffee preparation unit, in which a freshly brewed coffee beverage is automatically prepared and dispensed via the output unit to a subjacent vessel, wherein the outlet assembly or assemblies are connected to a rinsing fluid source via a separate rinsing line.

The automatic beverage dispenser in particular comprises at least one syrup container, from which syrup can be dispensed as needed via an inner outlet disposed on the output unit and added to the coffee beverage, wherein the associated outer outlet is connected to the rinsing fluid source via a separate rinsing line.

The inner outlet can be connected to the associated syrup container via a syrup line, wherein a syrup pump is disposed in the syrup line.

The syrup pump in particular has a reversible pumping direction.

A further embodiment of the automatic beverage dispenser is characterized in that multiple, in particular replaceable, syrup containers are provided, which are connected to associated separate inner outlets via separate syrup lines, in particular by way of detachable fluid couplings, and a dedicated syrup pump is disposed in each of the syrup lines.

In particular, a dedicated rinsing device comprising the outer outlet is associated with the inner outlets, the rinsing device being connected to the rinsing fluid source via a dedicated input end.

Alternatively, a shared rinsing device comprising the outer outlets can be associated with all inner outlets, the rinsing device being connected to the rinsing fluid source via an input end.

The rinsing fluid source can be designed as a separate unit.

It is also conceivable, however, that the rinsing fluid source is part of the coffee preparation unit.

A further embodiment of the automatic beverage dispenser according to the invention is characterized in that a compressed air source is provided, which is connected to the output unit via a compressed air pipe for blowing air onto the inner outlets.

However, the automatic beverage dispenser according to the invention can also comprise a hot water system and a powder container, which supply hot water or a beverage powder to a mixer, which at the output end side is connected to the output unit, wherein the outlet assembly or assemblies are connected to a rinsing fluid source via a separate rinsing line.

It is furthermore conceivable that the automatic beverage dispenser comprises a syrup container and a milk unit supplying milk or frothed milk, which are both connected to the output unit.

In particular, it is possible that the milk unit is connected to an outer outlet of an outlet assembly, and the syrup container is connected to the associated inner outlet of the outlet assembly. In this way, thorough mixing of the milk with the syrup can be achieved.

The outlet assembly connected to the milk unit can moreover be connected to a rinsing fluid source via a separate rinsing line. In this way, the portion of the output unit which contains milk residue can be cleaned in a simple manner.

The method according to the invention for operating an automatic beverage dispenser according to the invention is characterized in that at least one of the outlet assemblies is automatically cleaned at predefined points in time by a rinsing fluid being rinsed around the outside of the inner outlet via the outer outlet.

In particular, the inner outlet can be cleaned after each time a beverage is dispensed.

However, it is also conceivable that the inner outlet is cleaned after a predetermined number of times that beverages have been dispensed.

It is furthermore conceivable that the inner outlet is cleaned after a predefined time has elapsed.

One embodiment of the method according to the invention is characterized in that the automatic beverage dispenser comprises an output unit having multiple inner outlets and that the inner outlets are cleaned separately as needed.

However, it is also conceivable that the automatic beverage dispenser comprises an output unit having multiple inner outlets and that the inner outlets are always cleaned together.

A further embodiment of the method according to the invention is characterized in that the automatic beverage dispenser comprises one or more syrup containers, which are connected in each case to the inner outlets of the output unit via a syrup line, and during a rinsing process for rinsing or cleaning the syrup line, rinsing fluid is suctioned into the respective inner outlet and transported in the direction of the syrup container through the syrup line.

For dispensing syrup, syrup can be pumped in particular from the respective syrup container by way of a syrup pump having a reversible pumping direction through the syrup line to the associated inner outlet, wherein the associated syrup pump is operated with the reverse pumping direction for suctioning the rinsing fluid.

A further embodiment of the method according to the invention is characterized in that, as an alternative or in addition to cleaning the inner outlets, compressed air is blown onto the inner outlets so as to eliminate syrup drops adhering to the inner outlets.

The compressed air is blown out in particular via the outer outlets.

In all cases, water, and more particularly hot water, is preferably used as the rinsing fluid.

In the case of an automatic beverage dispenser that is provided with a mixer, it is advantageous if the outlet assembly connected to the mixer is automatically cleaned at predefined points in time by a rinsing fluid being rinsed around the outside of the inner outlet via the outer outlet.

In the case of an automatic beverage dispenser that is provided with a milk unit, it is advantageous if the outlet assembly connected to the milk unit is automatically cleaned at predefined points in time by rinsing fluid being discharged via the outer outlet.

BRIEF EXPLANATION OF THE FIGURES

The invention will be described in greater detail hereafter based on exemplary embodiments in conjunction with the drawings. In the drawings.

WAYS TO IMPLEMENT THE INVENTION

Figure 1:
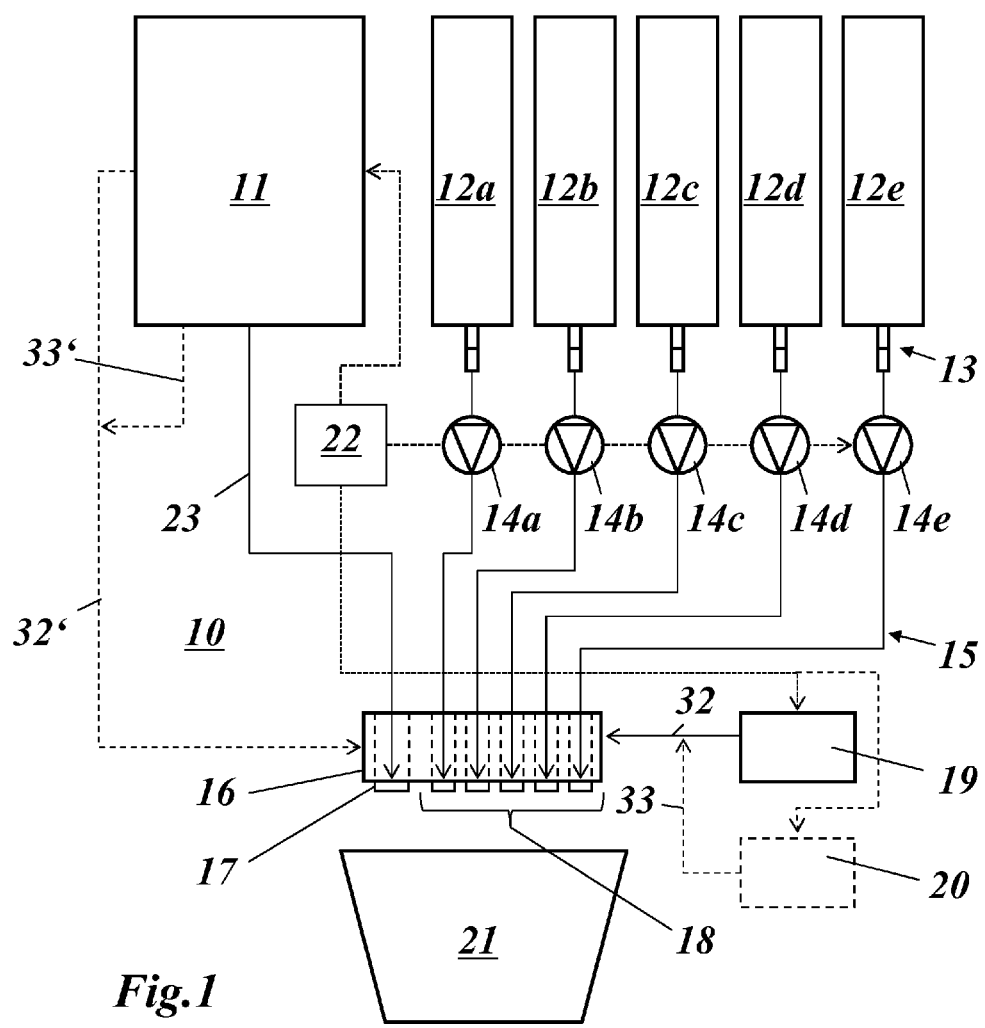
FIG. 1 shows a simplified diagram of an automatic beverage dispenser comprising a coffee preparation unit and multiple syrup containers and an output unit according to one exemplary embodiment of the invention.

FIG. 1 shows the simplified diagram of an automatic beverage dispenser according to one exemplary embodiment of the invention. The automatic beverage dispenser 10 comprises a coffee preparation unit 11, in which coffee beans are freshly ground and the ground coffee is filled into a brewing unit, where hot water is added to pass through for brewing a coffee beverage. The resulting coffee beverage is conducted via a coffee line 23 to an output unit 16, where it is dispensed via an outlet assembly in the form of a coffee outlet 17 in a subjacent vessel, in particular a cup 21.

Prior to, during or after dispensing of the coffee beverage, and in addition to frothed or unfrothed milk, a selected flavored additive can be dispensed into the cup 21 as an ingredient in a measured quantity, which is stored, for example in syrup form, in various syrup containers 12a-e within the automatic beverage dispenser 10.

In addition to the coffee outlet 17, for this purpose multiple separate inner outlets 18 are provided in the output unit 16 as syrup outlets, which are fluidically connected to the associated syrup containers 12a-e via dedicated syrup lines 15 and detachable fluid couplings 13. A syrup pump 14a-e, by way of which a predetermined amount of syrup can be pumped to the output unit 16, is disposed in each of the syrup lines 15. The syrup lines 15 can in particular be designed as flexible hoses. The syrup pumps 14a-e can likewise be designed as peristaltic pumps. With such pumps, the pumping direction can be reversed by reversing the direction of rotation of the drive unit. Additionally, valves (not shown in the figures), such as pinch valves, can be provided for opening or blocking certain lines or line sections.

A rinsing fluid is provided for rinsing or cleaning the inner outlets or syrup outlets 18, the rinsing fluid being conducted to the output unit 16, and in the output unit 16 to the inner outlets 18, where it is expelled concentrically surrounding the inner outlet. The rinsing fluid, which can in particular be hot water with or without added detergents, is supplied by a rinsing fluid source 19, which is connected to the output unit 16 via a rinsing line 32. For example, the rinsing fluid source 19 can be connected to a permanent water connection or a water reservoir of the automatic beverage machine 10 and comprise dedicated devices for heating water. However, it is also conceivable to supply the rinsing fluid via another rinsing line 32' directly from the coffee preparation unit 11, which contains separate means for heating water (boiler) for brewing the coffee.

Moreover, a compressed air source 20 (dotted line in FIG. 1) can be present, which instead of the rinsing fluid supplies compressed air to the output unit 16 via a compressed air pipe 33, where the compressed air (instead of the rinsing fluid) is directed at the inner outlets 18 in such a way that syrup drops (29 in FIG. 2) adhering to the inner outlets 18 are blown off.

If a separate compressed air source (air pump) for preparing frothed milk is present in the coffee preparation unit 11, the compressed air can also be withdrawn therefrom and supplied to the output unit 16 via a compressed air pipe 33'. If the frothed milk is created in a frothing device in the output unit 16 itself with the aid of compressed air, the compressed air can also branched off there.

The compressed air supply, however, can also be downstream of a rinsing process so as to blow off any residue of the rinsing fluid from the inner outlets 18.

Figure 2:
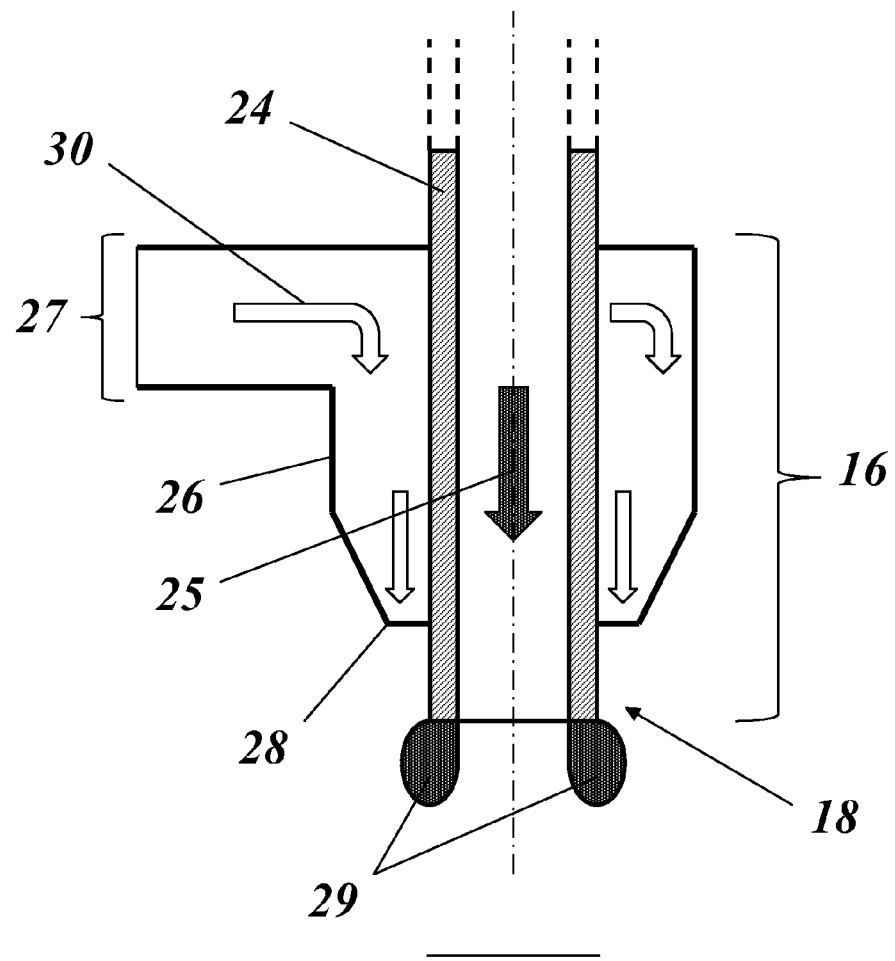
FIG. 2 shows a sectional view of the exemplary design of an outlet assembly from the automatic beverage dispenser according to FIG. 1, in this case comprising an associated rinsing device according to a further exemplary embodiment of the invention.

An individual outlet assembly comprising an inner outlet 18 can be designed as shown in FIG. 2. The inner outlet 18 here is formed by the end of a line 24, which (in the case of the automatic beverage dispenser of FIG. 1) connects the output unit 16 to the associated syrup container 12a-e as a syrup line 15, for example. The end of the line is surrounded by an annular chamber, which forms an outer outlet and is used for the concentric feeding of the rinsing fluid 30. In FIG. 2, this concentric arrangement of a central syrup line (or inner outlet) for the syrup 25 and the surrounding rinsing fluid channel (or outer outlet) is referred to as a rinsing device 26 within the output unit 16.

During the rinsing process, the rinsing fluid 30 exits as a concentric fluid sheath through an annular nozzle 28 of the outer outlet and entrains or dissolves drop 29 located at the line end of the inner outlet and removes dried syrup residue adhering to the line end. As was already mentioned above, drops 29 located at the line end, however, can also be occasionally removed by blowing compressed air, instead of the rinsing fluid 30, through the annular nozzle 28 of the outer outlet.

In FIG. 2, the outlet assembly or rinsing device 26 comprises an input end 27 via which rinsing fluid 30 can be supplied from the separate rinsing fluid source 19 or the coffee preparation unit 11, or via which compressed air can be supplied from the compressed air source 20 or the coffee preparation unit 11.

It goes without saying that a control unit 22 is present for controlling the rinsing or blowing-off process, the control unit in the simplest case also controlling the coffee preparation unit 11 and the syrup pumps 14a-e so as to chronologically coordinate the various processes. Moreover, valves can additionally be provided at various locations, however these are not shown in the figures.

Figure 3:
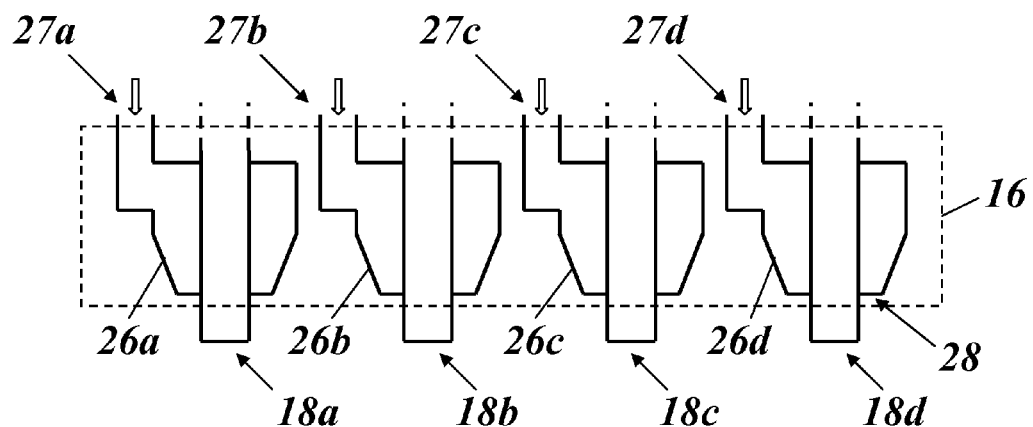
FIG. 3 shows the basic arrangement of multiple outlet assemblies, the outer outlets of which in each case have a dedicated input end.
Figure 4:
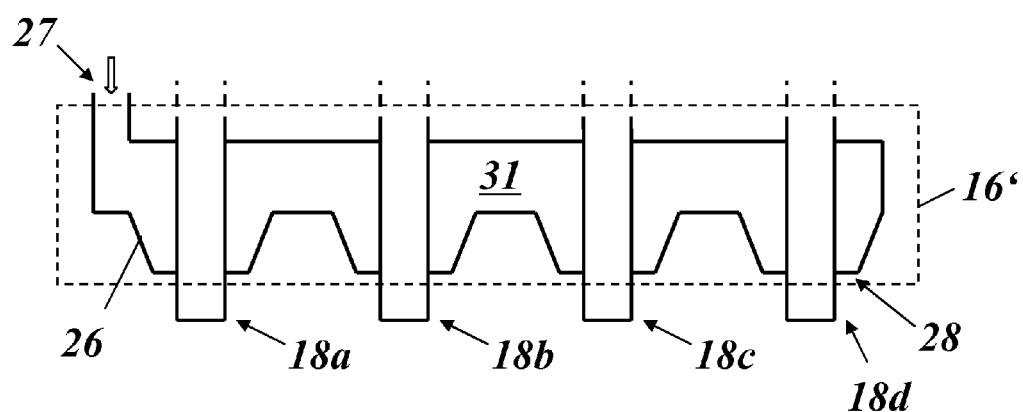
FIG. 4 shows an illustration comparable to FIG. 3 of multiple outlet assemblies having a shared input end.

Rinsing or cleaning of the inner outlets 18 can essentially be carried out in two different ways according to FIG. 3 and FIG. 4. In the case of FIG. 3, a rinsing device 26a-d having a dedicated input end 27a-d is associated with each inner outlet 18a-d in the output unit 16, so that each inner inlet can be rinsed separately. For this purpose, the input ends to the individual rinsing devices 26a-d must be provided separately and individually controllable, which increases the complexity of the apparatus.

In the case of FIG. 4, all inner outlets 18a-d of the output unit 16' have a shared rinsing device 26 comprising only one input end 27 and a distribution chamber 31 via which the rinsing fluid can flow to all annular nozzles or outer outlets. In this case, all the inner outlets 18a-d can only be rinsed together. However, the complexity in terms of lines and control is lower as compared to the design from FIG. 3.

It can also be provided in both cases that the outlet assembly 17 for the coffee beverage is likewise configured with a rinsing device of the type shown in FIG. 2 so as to be able there as well to rinse the inner outlet as needed with the rinsing fluid or to blow compressed air onto it. The same also applies to any possible milk or frothed milk outlet or outlets for other additional types of beverages, such as a chocolate beverage (see FIGS. 6 and 7).

Figure 5:
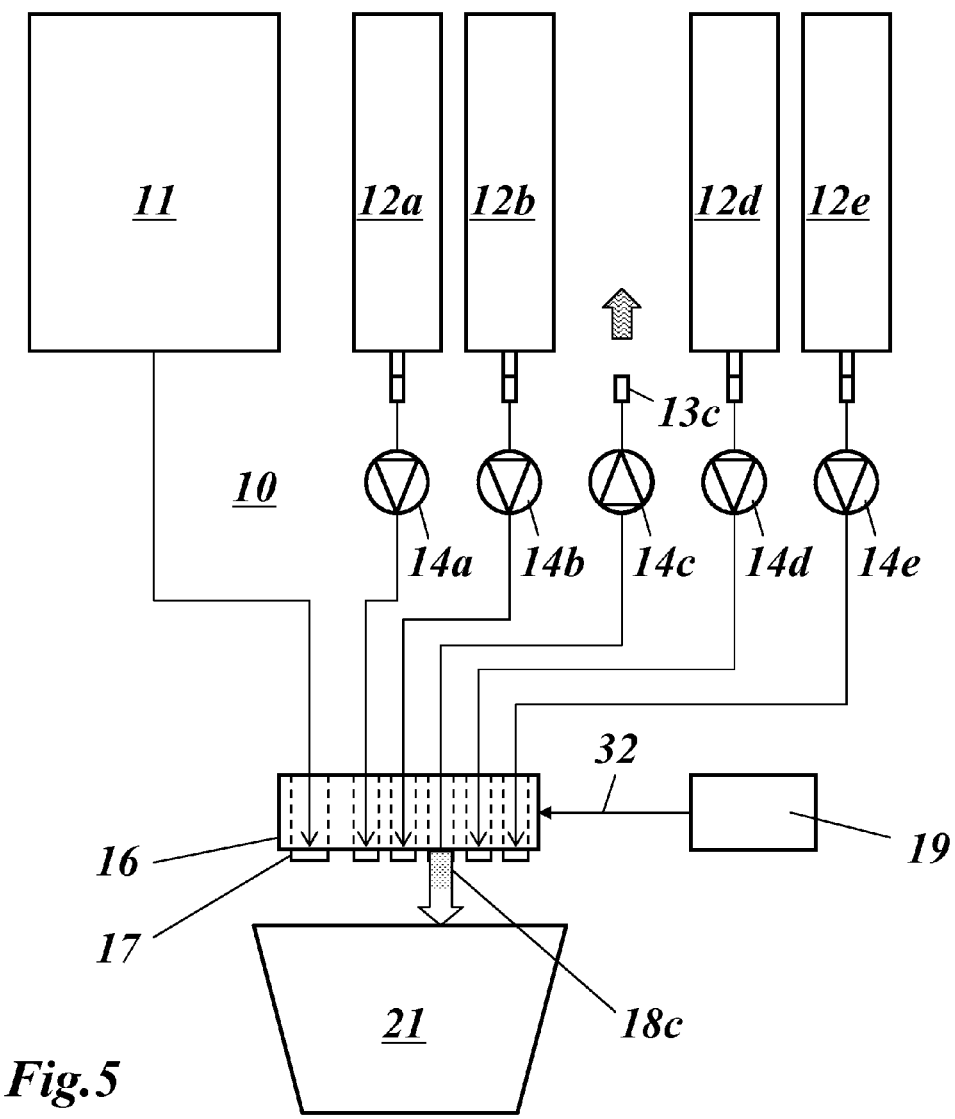
FIG. 5 shows the automatic beverage dispenser of FIG. 1 during the flushing of a syrup line.

The dispensing of a sheath flow of rinsing fluid via the annular nozzle 28 of the outer outlet during the rinsing process also allows basic rinsing of a syrup line 15 or of another line in a simple manner, as it may become necessary, for example when replacing a syrup container, and more particularly when changing the type of syrup. This rinsing can be carried particularly easily when pumps having a reversible pumping direction are used as the syrup pumps 14a-e. The configuration of such line rinsing is illustrated in FIG. 5, which shows the rinsing of the syrup line from the syrup container 12c to the output unit 16.

Initially, the particular fluid coupling 13c is detached to remove the syrup container 12c. Then, a rinsing process is started at the inner outlet 18c. At the same time, the pumping direction of the syrup pump 14c is reversed. In this way, rinsing fluid is suctioned into the syrup line 15 from the sheath flow of the rinsing fluid exiting the associated annular nozzle 28 of the rinsing device 26 and is pumped to the fluid coupling 13c, where it can exit and be collected. This process can also be automated if appropriate controllable switching devices (valves) are provided between the syrup pump and the syrup container.

The inner outlets 18a-d (or other outlets) can be rinsed every time after syrup (fluid) is dispensed. However, it is just as conceivable that a rinsing process is not initiated until syrup has been dispensed a predefined number of times if the risk of dirt accumulation is low. It is furthermore conceivable for the rinsing processes to be time-controlled, which is to say to be initiated after a certain operating duration has lapsed or at the end of a day. Rinsing processes can of course also be initiated at any time by pressing a special operating button, if there is a need.

Blowing off drops by way of compressed air can be provided for between two rinsing processes so as to hamper the formation of residue on the inner outlet, without a full rinsing process being necessary. In this way, the rinsing intervals can be extended. Blowing off can take place in a manner controlled as a function of time or events. However, it is also conceivable to attach special sensors to the output unit 16, 16', which detect the occurrence of drops (or residue) and then trigger a controlled blow-off or rinsing process.

The advantages of the invention are not limited to automatic beverage dispensers in which coffee is freshly prepared with or without flavoring additives.

Figure 6:
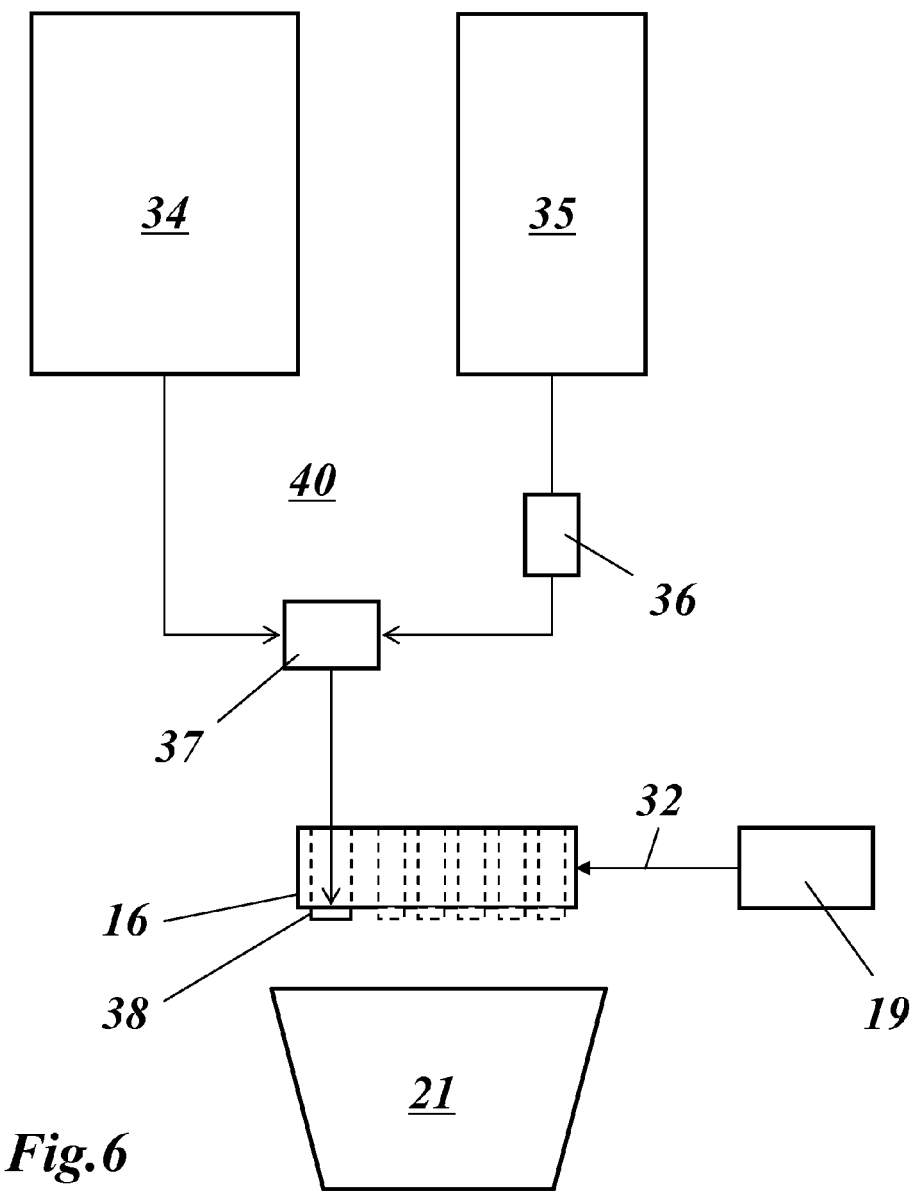
FIG. 6 shows an automatic beverage dispenser according to a further exemplary embodiment of the invention, which is designed to produce a mixed beverage from a beverage powder and hot water.

The concentric arrangement of the inner outlet and outer outlet in the output unit can also advantageously be used in an automatic beverage dispenser in other connections. FIG. 6 shows an automatic beverage dispenser 40 in which (as an alternative or in addition to preparing a coffee beverage) a hot beverage (broth, tea, hot chocolate or the like) can be prepared, which is prepared from hot water and an appropriate beverage powder by mixing. For this purpose, a hot water system 34, which dispenses hot water to a mixer 37 via an output end, is provided in the automatic beverage dispenser 40. Moreover a powder container 35 for a beverage powder is disposed in the automatic beverage dispenser 40, from which a predefined amount of beverage powder can be removed and transported to the mixer 37 by way of a delivery device 36. In the mixer 37, the desired hot beverage is prepared from the hot water and the beverage powder and is supplied to the output unit 16, where it reaches a subjacent cup 21 via a mixed beverage outlet 38.

The mixed beverage outlet 38 can be part of an outlet assembly that—as was already described—comprises a central inner outlet and a concentrically surrounding outer outlet. Rinsing or cleaning of the inner outlet that is used for dispensing the beverages here can again take place by expulsion of a rinsing fluid that is supplied from a rinsing fluid source 19 via the outer outlet.

Figure 7:
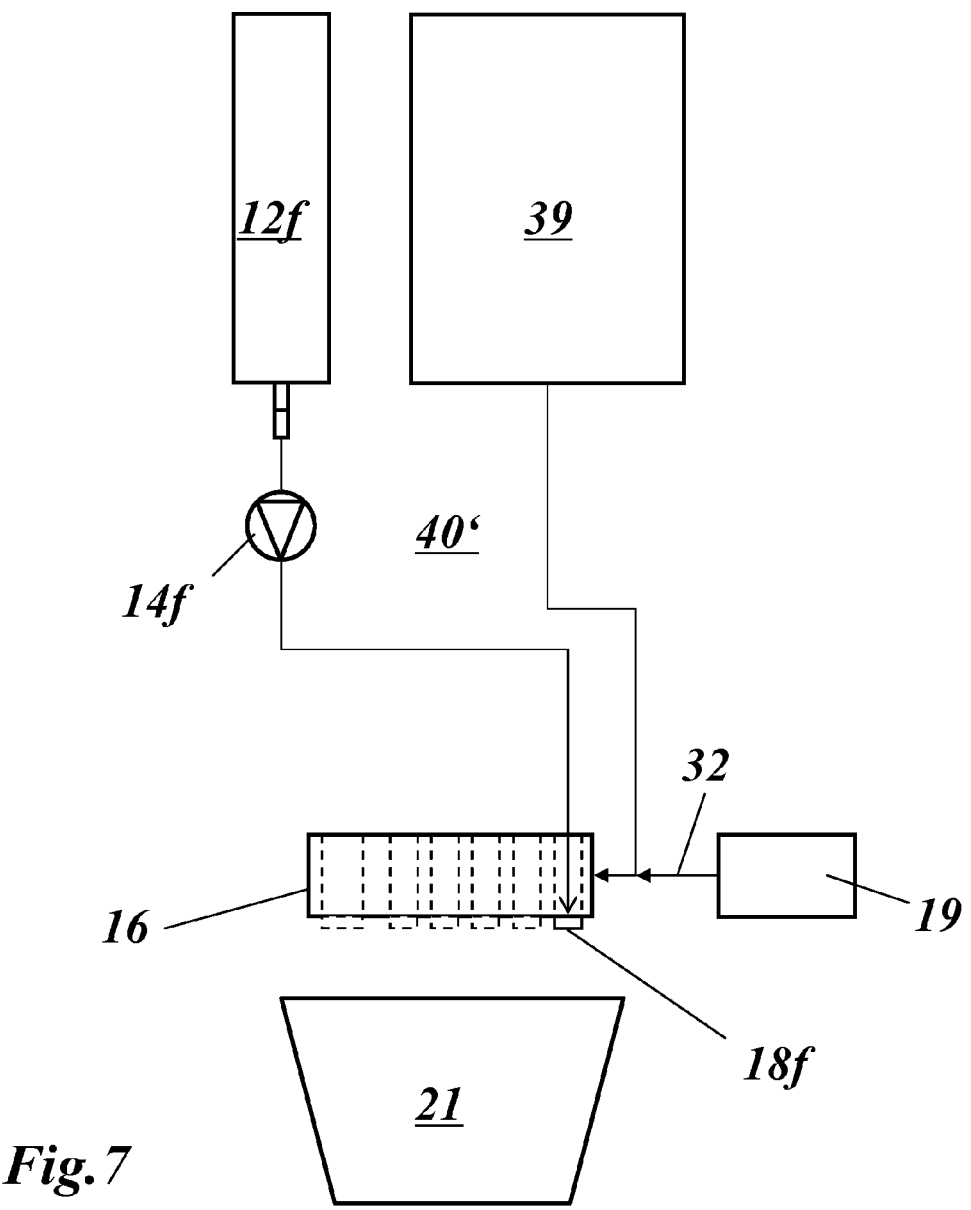
FIG. 7 shows an automatic beverage dispenser according to another exemplary embodiment of the invention, which is designed to produce a milk beverage from milk or frothed milk and syrup.

The concentric arrangement of the inner outlet and the outer outlet, however, can also advantageously be used for an automatic beverage dispenser 40' according to FIG. 7, which (as an alternative or in addition to preparing a coffee beverage) can prepare and dispense a milk beverage. A milk unit 39 is provided for this purpose, which is associated with a syrup container 12f having an appropriate syrup pump 14f. The syrup pump 14f delivers syrup as needed to the inner outlet 18f in the output unit 16, while the milk unit 39, which can supply milk or frothed milk in hot or cold form, dispenses milk via the associated outer outlet. Due to the concentric discharge of syrup (in the interior) and milk (in the outer sheath), particularly thorough mixing is achieved, which benefits the quality of the dispensed beverage. It is additionally advantageous here that the outer outlet containing milk residue can be rinsed and cleaned very easily in the manner already described using a rinsing fluid that is supplied from a rinsing fluid source via the rinsing line 33.

The problem and solution of the present invention can be summarized as follows: While in the past syrup was frequently added manually in measured quantities to various beverages, a trend is recognizable today that is intended to meter the syrup fully automatically. Syrup has the great advantage that it can be stored for a very long time without compromising the quality. In contrast, effective dispensing is problematic. At this dispensing point, the syrup comes into contact with the ambient area and begins to crystallize. Due to the consistency of the syrup, however, drops also form at the outlet.

In one embodiment of the invention, the syrup lines are held by a concentrically shaped support. This support is designed so that a rinsing liquid (such as hot water, detergent or the like) can be rinsed around the outer hose side via a rinsing connection and thus possible syrup residue can be washed off.

This rinsing cycle can be carried out any arbitrary number of times. Minimal rinsing is possibly carried out every time after a product is dispensed so as to prevent the accumulation of crystallized syrup, or daily after an extended operating time.

It is also possible for this system to prevent continued dripping of syrup by using compressed air.

Another option is that the syrup pump can be reversed during the rinsing process and rinsing water is thus suctioned through the syrup line. In this way, fully automatic cleaning can be implemented using hot water before a new syrup container is mounted.

The concentric arrangement of the inner outlet and outer outlet in the outlet assemblies of the output unit, however, is not only advantageous for dispensing syrup so as to flavor coffee beverages, but can be employed in general if the automatic beverage dispenser is designed to dispense hot beverages such as broth, tea, hot chocolate or the like.

Mixing can be improved by the concentric outlet assembly in particular when milk beverages are dispensed, wherein simplified cleaning of the outlet assembly is achieved when the milk or the frothed milk is admixed via the outer outlet.

LIST OF REFERENCE NUMERALS 10, 40, 40' automatic beverage machine
11 coffee preparation unit
12a-f syrup container
13, 13c fluid coupling
14a-f syrup pump (for example, peristaltic pump)
15 syrup line
16, 16' output unit
17 coffee outlet
18 inner outlet
18a-d inner outlet
19 rinsing fluid source
20 compressed air source
21 cup
22 control unit
23 coffee line
24 line
25 syrup
26 rinsing device
26a-d rinsing device
27 input end
27a-d input end
28 annular nozzle
29 drop
30 rinsing fluid
31 distribution chamber
32, 32' rinsing line
33, 33' compressed air pipe
34 hot water system
35 powder container
36 delivery device
37 mixer
38 mixed beverage outlet
39 milk unit

The invention claimed is:

1. An output unit for an automatic beverage dispenser configured for dispensing a beverage and/or ingredients for a beverage to a subjacent vessel, the output unit comprising a plurality of outlet assemblies for beverages and/or ingredients, each of the outlet assemblies comprising a central inner outlet and an outer outlet, which concentrically surrounds the inner outlet, and each of the inner outlet and the outer outlet are connected to a beverage container and/or an ingredient container of beverage fluid, wherein the outer outlet is designed as an annular nozzle directed in an outlet direction so that the beverage fluid that is dispensed through the outer outlet encloses the inner outlet in the form of a concentric sheath, wherein the inner outlet is formed by an end of a line, an outside wall of said line forming an inside wall of the outer outlet, and the outer outlet is recessed relative to the inner outlet in the outlet direction, and wherein at least one outer outlet of the outlet assemblies is part of a rinsing device connected to a rinsing fluid source of rinsing fluid, to clean or rinse associated inner outlets by conducting the rinsing fluid through said concentric sheath formed by said outer outlet.

2. An output unit according to claim 1, characterized in that the output unit comprises a plurality of outlet assemblies, which are disposed next to each other and which in each case comprise an inner and an outer outlet, and outer outlets of the outlet assemblies comprise a shared input ends.

3. An output unit according to claim 1, characterized in that the output unit comprises a plurality of outlet assemblies, which are disposed next to each other and which in each case comprise an inner and an outer outlet, and outer outlets of the outlet assemblies comprise a shared input end.

4. An automatic beverage dispenser for dispensing hot beverages, comprising an output unit, by which said beverage and/or ingredients for said beverage are dispensed to said subjacent vessel, characterized in that the output unit is designed according to claim 1.

5. The automatic beverage dispenser according to claim 4, further comprising a hot water system and a powder container, which dispense hot water and a beverage powder to a mixer connected on the output end side to the output unit, wherein the outlet assembly or assemblies are connected to the rinsing fluid source via a separate rinsing line.

6. The method for operating an automatic beverage dispenser according to claim 5, characterized in that the outlet assembly connected to the mixer is automatically cleaned at predefined points in time by the rinsing fluid being rinsed around the outside of the inner outlet via the outer outlet.

7. The automatic beverage dispenser according to claim 4, further comprising a syrup container and a milk unit supplying milk or frothed milk, which are both connected to the output unit.

8. The automatic beverage dispenser according to claim 7, characterized in that the milk unit is connected to an outer outlet of an outlet assembly, and the syrup container is connected to the associated inner outlet of the outlet assembly.

9. The method for operating an automatic beverage dispenser according to claim 8, characterized in that the outlet assembly connected to the milk unit is automatically cleaned at predefined points in time by the rinsing fluid being discharged via the outer outlet.

10. The automatic beverage dispenser according to claim 7, characterized in that the outlet assembly connected to the milk unit is connected to the rinsing fluid source via a separate rinsing line.

11. The automatic beverage dispenser according to claim 4, further comprising a coffee preparation unit, in which a freshly brewed coffee beverage is automatically prepared and dispensed via the output unit to a subjacent vessel, wherein the outlet assembly or assemblies are connected to the rinsing fluid source via a separate rinsing line.

12. An automatic beverage dispenser according to claim 11, characterized in that the rinsing fluid source is designed as a separate unit.

13. An automatic beverage dispenser according to claim 11 further comprising a compressed air source connected to the output unit via a compressed air pipe for blowing air onto the inner outlets.

14. A method for operating an automatic beverage dispenser according to claim 11, characterized in that at least one of the outlet assemblies is automatically cleaned at predefined points in time by the rinsing fluid the rinsing fluid being rinsed around an outside of the inner outlet via the outer outlet.

15. The method according to claim 14, characterized in that the inner outlet is cleaned after each time a beverage is dispensed.

16. The method according to claim 14, characterized in that the inner outlet is cleaned after a predetermined number of times after beverages have been dispensed.

17. The method according to claim 14, characterized in that the inner outlet is cleaned after a predefined time has lapsed.

18. A method according to claim 14, characterized in that the automatic beverage dispenser comprises an output unit having a plurality of inner outlets, and the inner outlets are cleaned separately as needed.

19. A method according to claim 14, characterized in that the automatic beverage dispenser comprises an output unit having a plurality of inner outlets, and that the inner outlets are always cleaned together.

20. A method according to claim 14, characterized in that the automatic beverage dispenser comprises one or more syrup containers, which are connected in each case to the inner outlets of the output unit via a syrup line, and during a rinsing process for rinsing or cleaning the syrup line, the rinsing fluid is suctioned into the respective inner outlet and is transported in the direction of the syrup container through the syrup line.

21. The method according to claim 20, characterized in that, for dispensing syrup, syrup is pumped from the respective syrup container by way of a syrup pump having a reversible pumping direction through the syrup line to the associated inner outlet, and the associated syrup pump is operated with the reverse pumping direction for suctioning the rinsing fluid.

22. A method according to claim 14, characterized in that, as an alternative or in addition to cleaning the inner outlets, compressed air is blown onto the inner outlets so as to eliminate syrup drops (29) adhering to the inner outlets.

23. The method according to claim 22, characterized in that the compressed air is blown out via the outer outlet.

24. A method according to claim 14, characterized in that hot water is used as the rinsing fluid.

25. The automatic beverage dispenser according to claim 11, further comprising at least one syrup container, from which syrup can be dispensed as needed via an inner outlet disposed on the output unit and added to the coffee beverage, wherein the associated outer outlet is connected to the rinsing fluid source via a separate rinsing line.

26. The automatic beverage dispenser according to claim 25, characterized in that the inner outlet is connected to the syrup container via a syrup line, and a syrup pump is disposed in the syrup line.

27. The automatic beverage dispenser according to claim 26, characterized in that the syrup pump has a reversible pumping direction.

28. An automatic beverage dispenser according to claim 25 further comprising a plurality of replaceable syrup containers connected to associated separate inner outlets via separate syrup lines by way of detachable fluid couplings, wherein a dedicated syrup pump is disposed in each of the syrup lines.

29. The automatic beverage dispenser according to claim 28, characterized in that a dedicated rinsing device comprising the outer outlet is associated with each of the inner outlets, the rinsing device being connected to the rinsing fluid source via a dedicated input end.

30. The automatic beverage dispenser according to claim 29, characterized in that a shared rinsing device comprising the outer outlet is associated with all the inner outlets, the rinsing device being connected to the rinsing fluid source via an input end.

31. An automatic beverage dispenser according to claim 25, characterized in that the rinsing fluid source is part of the coffee preparation unit.

32. An output unit for an automatic beverage dispenser configured for dispensing a beverage and/or ingredients for a beverage to a subjacent vessel, the output unit comprising a plurality of outlet assemblies for beverages and/or ingredients, each of the outlet assemblies comprising a central inner outlet and an outer outlet, which concentrically surrounds the inner outlet, and each of the inner outlet and the outer outlet are connected to a beverage container and/or an ingredient container of beverage fluid, wherein the outer outlet is designed as an annular nozzle directed in an outlet direction so that a beverage fluid that is dispensed through the outer outlet encloses the inner outlet in the form of a concentric sheath, wherein the inner outlet is formed by an end of a line, an outside wall of said line forming an inside wall of the outer outlet, and the outer outlet is recessed relative to the inner outlet in the outlet direction, and wherein at least one outer outlet of the outlet assemblies is part of a rinsing device connected to a rinsing fluid source of rinsing fluid, to clean or rinse associated inner outlets by conducting the rinsing fluid through said concentric sheath formed by said outer outlet, with the inner outlets of said outlet assemblies each being connected to a syrup container via a syrup line.

* * * * *